United States Patent Office 3,306,915
Patented Feb. 28, 1967

3,306,915
OXIDATION OF AROMATIC COMPOUNDS
Theodore Vrbaski, Harvey, Ill., assignor to Sinclair Research, Inc., New York, N.Y., a corporation of Delaware
No Drawing. Filed Apr. 3, 1963, Ser. No. 270,165
7 Claims. (Cl. 260—346.7)

This invention relates to the oxidation of aromatic compounds and more particularly is concerned with an improved catalyst system for the vapor phase, oxygen-containing gas oxidation of aromatic compounds, especially ortho-di(lower alkyl)benzenes to corresponding anhydrides.

Many processes are well known whereby aromatic compounds may be oxidized to commercially valuable products by vapor phase reaction with an oxygen-containing gas, e.g. air, in the presence of metal oxide catalysts. Typical of such processes are the oxidation of benzene to maleic anhydride and the oxidation of ortho-xylene or naphthalene to phthalic anhydride. In commercial vapor phase oxidation processes a mixture of an oxygen-containing gas such as air, together with the vapors of the aromatic feedstock are reacted at elevated temperatures in the presence of an oxidation catalyst which is usually a vanadium oxide and which may be supported on an inert carrier. Depending upon the nature of the aromatic feedstock, the catalyst employed, and the product desired, reaction conditions are selected within a temperature range of about 250 to 600° C., catalyst contact times of between about 0.01 to 5 seconds, pressures from about 1 to 10 atmospheres absolute, and molar ratios of oxygen to aromatic hydrocarbon between about 10:1 and 90:1, preferably about 15:1 to 60:1.

However, in catalytic vapor phase oxidations, it has been found that notwithstanding the use of an active catalyst it is necessary to exercise the most rigid control over reaction conditions, particularly the catalyst temperature and contact time, in order to obtain oxidation of the aromatic feedstock to the desired product without over oxidation ultimately to carbon oxides and water or without the production of less desirable by-products. Furthermore, the adaptation of catalytic techniques to the vapor phase oxdiation of aromatics presents a number of problems, foremost of which is the problem of catalyst abrasion, and in conjunction therewith, the problem of obtaining an abrasion-resistant catalyst of suitable activity to produce selectively the desired product. The present invention has as one of its objects the provision of a vanadium pentoxide-containing catalyst possessing a high degree of abrasion resistance when used for the vapor phase oxidation of aromatics, for example, of ortho-xylene or naphthalene to phthalic anhydride.

Yet another problem of great concern in a vapor phase oxidation is selectively producing the desired anhydride while blocking the production of undesired by-products such as phthalide or ortho-tolualdehyde and preventing the formation of excessive amounts of carbon oxides. Heretofore, it has been necessary, for instance, to provide elaborate and expensive reactor vessel designs to effect and maintain stringent control over process variables so that yields from a commercial vapor phase operation would even approach a satisfactory level. Notwithstanding the meticulous care taken, yields often were considered short of being adequate.

In vapor phase oxidations, the obvious benefits in employing a more selective catalyst system to attain a higher product yield with lower loss to undesired by-products such as phthalide or ortho-tolualdehyde and to carbon oxides give, in addition, marked advantage from the standpoint of controlling oxidations in commercial plants. For instance, the observed heat which is liberated in this oxidation process is always much greater than the calculated heat of reaction. For instance, the heat of oxidation of ortho-xylene amounts to 308.3 kcal./mole as compared with 448.9 kcal./mole for naphthalene. In the oxidatio nof the former no carbon oxides are formed and no rupture of ring takes place. The heat of oxidation of benzene to maleic anhydride amounts to 448.9 kcal./mole. However, in practice due to over-oxidation the total heat liberated is about the same in each case and amounts to about 700 kcal./mole. The large heat of reaction necessitates the employment of elaborate heat-dissipating equipment to avoid the formation of hotspots in the catalyst bed and to prevent burning of the feedstock or product to undesirable by-products such as carbon oxides. To remove heat of reaction and prevent the formation of catalyst hotspots which usually result in sintering the catalyst surface, it is the practice either to employ a fluidized catalyst bed or to place the catalyst in thin-walled, small diameter, metal tubes surrounded by boiling or molten heat-exchange media. By providing a more selective catalyst system, the extent of oxidation of, for instance, ortho-xylene to undesirable by-products such as maleic anhydride and carbon oxides is minimized. This results in a lowering of the actual heat liberated and reduces, at least to some extent, the problem of temperature control of the catalyst bed. Consequently, as an added advantage, existing plant feed rates may be increased since the burden heretofore imposed on heat removal equipment would be substantially reduced.

Accordingly, it is an object of the present invention to improve the yields of processes for the vapor phase oxidation of aromatic compounds to commercially valuable products by improving the selectivity of the catalyst system and, accordingly, reduce the amount and nature of by-products formed in the process. Yet another object is to facilitate the practice of commercial oxidations by reducing the practical heat of reaction in order to avoid the formation of hotspots in the catalyst bed which result in the sintering of the catalyst and concomitant reduction of catalyst activity and selectivity.

The objects of this invention may be attained in a convenient manner by conducting vapor phase, molecular oxygen-containing gas, e.g., air, oxidation of aromatic hydrocarbons in the presence of a vanadium pentoxide catalyst provided with promotional amounts of zirconium oxide and an oxide of a lanthanide series metal, i.e., one having an atomic number in the range of 57 to 71. Advantageously, the doubly promoted metal oxide catalyst is supported on an inert carrier such as alpha-alumina, and in this case the novel catalyst often contains from about 1 to 20 weight percent of catalytically active metal oxides based on the total weight of the supported catalyst. Usually in the catalyst, whether supported or unsupported, zirconium is present in amounts of about 0.1 to 5 weight percent and the lanthanide series metal is present in amounts of about 0.01 to 5 weight percent, both metal components being calculated as their oxides, based on the vanadium oxide. In the supported catalyst, the catalytic metal components are usually partially fused, i.e., fused sufficiently to obtain a catalyst having a low surface area, for instance, of less than one square meter per gram. Generally, the supported catalyst experiences a 20 to 80 percent fusion, preferably about 40 to 60 percent, while the unsupported catalyst is often essentially completely fused. To provide the catalyst having a low surface area, the vanadium pentoxide and promoters are preferably deposited on an inert low surface carried although the vanadium oxide, itself, can serve as the support as well, if desired. As noted above, alpha-alumina is the preferred inert low surface area carrier although other useful supports include zeolites, asbestos, pumice, quartz, corundum, kieselguhr and silica gel. Unsupported catalysts may be used as noted above and can be made by fusing the corresponding metal oxides.

Where the catalyst is to be deposited on an inert carrier, the metal oxides may be provided by any of the common manufacturing methods. Included among these methods are thermal decomposition of a volatile metal compound; impregnation of the carrier with molten catalytic metal; precipitation from a colloidal suspension of the catalytic metals in an inert liquid; or preferably, impregnation of the carrier with a slurry or solution containing a catalyst salt. For instance an inert carrier such as alpha-alumina may be impregnated with an aqueous solution of a vanadium and promoting metal salt. Preferably the catalyst is prepared by reacting vanadium pentoxide or ammonium vanadate and a carboxylic acid such as oxalic, citric, tartaric, and malic to produce a water-soluble vanadyl salt. To the solution may be added the soluble salt, e.g., nitrate, acetate, oxalate, etc. of the promoting metals. The resulting solution may then be used in preparing the novel catalyst of this invention by addition to an inert carrier. The water is evaporated and the residue is heat-treated at a temperature of about 450 to 525° C. for a period of about 2 to 8 hours or longer, preferably, about 4 hours. Catalysts so prepared are characterized by a partially fused uniform coating of the active material on the carrier surface, i.e., the treatment at a temperature not substantially higher than about 525° C. provides a partially fused catalyst, i.e., one characterized by the presence of a mixture of crystalline and glass-like surface and they exhibit satisfactory abrasion-resistant properties. Preferably in fixed bed vapor processes the carrier is generally in the form of discrete particles, preferably of from about 3 to 10 mesh size, in the shape of pills, pellets, cylinders, beads, extrudates, granules, or the like. In fluidized bed reactors the catalyst carrier is generally finely divided powder or microspheres, having particle sizes between about 10 and 100 microns.

The ortho-(di-lower alkyl)benzenes suitable for oxidation to their corresponding anhydrides according to this invention contain at least one set of ortho-oriented lower alkyl radicals such as a non-tertiary alkyl radical having about 1 to 4 carbon atoms, for instance, methyl, ethyl, propyl, isopropyl, butyl, and other oxidizable alkyl radicals. These di-lower alkyl benzenes may also, advantageously contain more than one set of ortho groups such as are found for instance in durene. Each set may be oxidized to the anhydride form. The ortho groups on the benzene nucleus may, conveniently, form a carbocyclic ring with the nucleus as in the case of naphthalene and lower alkyl naphthalenes. Representative compounds suitably employed in the instant invention having one set of ortho-oriented groups are ortho-xylene, ortho-ethyltoluene, ortho-ethylcumene and ortho-diisopropylbenzene which may be oxidized to phthalic anhydride. Representative compounds having more than one set of ortho-oriented alkyl groups are durene (1,2,4,5-tetramethyl benzene) which may be converted to pyromellitic di-anhydride and prehnitene (1,2,3,4-tetramethyl benzene) which may be oxidized to mellophanic di-anhydride. Compounds which are also suitably employed in the instant invention are represented by, for instance, naphthalene, methyl-naphthalene and 2,3-dimethylnaphthalene which are oxidized to phthalic anhydride. Anthracene which forms anthraquinone and/or phthalic anhydride as well as phenanthrene which on oxidation produces a mixture of phenanthraquinone, diphenic acid anhydride and phthalic anhydride may also be used. Aromatic alicyclic ring compounds such as indene, indane, 1,4-dihydronaphthalene and tetralin, all of which have five or six-membered alicyclic rings connected to adjacent carbon atoms on an aromatic ring may be used and generally are converted to phthalic anhydride.

The operating conditions which give favorable yields for the vapor-phase oxidation of the aromatic feedstock may vary widely. The oxidation is generally and preferably conducted at superatmospheric pressure and elevated temperatures. One suitable range of pressures is about 20 to 200 p.s.i.g. or higher, preferably about 50 to 100 p.s.i.g. A suitable oxidation temperature is within the range of about 300 to 600° C., preferably about 400 to 500° C. with a feed rate of about 70 to 165 moles of air per mole of aromatic. The weight hourly space velocity is preferably about 0.05 to 0.3 hr.$^{-1}$ with a volumetric hourly space velocity of about 10,000 to 20,000 hr.$^{-1}$.

Recovery of the oxidation product may be effected by any one or more of numerous different procedures. For instance, phthalic anhydride is conveniently crystallized as colorless rhombic needles by cooling the reactor effluent gases. The effluent gases may also be scrubbed with aromatics such as benzene, xylenes, diphenyl or methyl-naphthalene. Scrubbing may be conducted in either a spray tower, in a packed column or in other equivalent equipment.

*Example I*

100 parts of vanadium pentoxide were added to a solution containing 130 parts of tartaric acid in 1500 parts of water. The suspension was then heated on a steam bath until all the vanadium pentoxide was reduced to vanadyl tartarate and vanadyl-vanadate giving, after about one hour, a clear solution with a distinct sky blue color. Aqueous solutions of zirconium nitrate (3.1 g. in 50 cc. of water) and terbium nitrate (0.83 g. terbium oxide dissolved in 50 cc. dilute nitric acid 1:1 in water) together with 800 g. of alpha-alumina carrier material having a particle size of 8 to 10 mesh, were added to this solution and the whole mass was heated on a steam bath while being stirred and evaporated to dryness.

The resulting catalyst was heat-treated in an electric furnace by gradually raising the temeperature of the furnace to 525° C. over a period of 6 hours and maintaining this temperature for two additional hours to form a partly fused coating on the support.

The prepared catalyst appeared under the microscope with 200× magnification as an uneven yellowish-brown, barbed surface covered with numerous isolated darker glassy areas of sintered catalyst.

The weight percent of vanadium, zirconium and terbium oxides, on a support-free basis in this catalyst amounted to 97.67%, 1.52% and 0.81%, respectively. It contained about 12.5 weight percent active material based on the total weight.

*Example II*

Essentially the same procedure as that outlined in Example I above was followed but the promoters used in this example were zirconium and praseodymium oxides which were added to the aqueous vanadyl tartarate solution as zirconium nitrate and praseodymium acetate in amounts of 3.1 parts and 1.7 parts by weight, respectively. The weight percent of vanadium, zirconium and praseodymium oxides on a support-free basis amounted to 97.63%, 1.60% and 0.77%, respectively.

Example III

Again the same procedure as outlined in Example I was used but in this instance the promoters employed were zirconium and samarium oxides which were added to the aqueous vanadyl tartarate solution, containing 100 parts of vanadium pentoxide as zirconium nitrate and samarium nitrate in amounts of about 9.3 parts and 4.0 parts by weight, respectively.

The weight percent of vanadium, zirconium and samarium on a support-free basis amounted to 94.13%, 4.39% and 1.48%, respectively.

Example IV 100 parts of vanadium pentoxide were added to 500 parts of hot hydrochloric acid. The partly dissolved suspension was then heated on a steam bath for about two hours, at which time all the vanadium pentoxide went into solution. Aqueuos solutions of zirconium nitrate (6.0 g. in 50 cc. of water) and preaseodymium acetate (3.4 g. in 50 cc. of water) together with 800 g. of alpha-alumina having a particle size of 8 to 10 mesh, were added to the solution. The whole mass was treated in essentially the same manner as that outlined in Example I. The weight percent of vanadium, zirconium and praseodymium oxides on a support-free basis in this catalyst amounted to 95.5%, 3.0% and 1.43%, respectively. It contained about 12.5 weight percent active material based on the total weight.

Example V

For the oxidation of ortho-xylene in a fixed bed reactor, the necessary equipment may be grouped into three zones. In the first, or reactant make-up zone, the proportions of air to ortho-xylene are established. The second or reactor zone comprises the physical reactor assembly with its auxiliaries for pre-heating the reactants and removing the heat of reaction. In the third or product-recovery zone, the reactor effluent is treated for the recovery of the anhydride.

More specifically, in the make-up zone, primary air is introduced into the system at superatmsopheric pressure and led to a vaporizer. With the secondary air and ortho-xylene, a 0.7 to 2.3 mole percent ortho-xylene in air mixture is formed, and fed to the second zone. Prior to introduction into the oxidation reactor the mixture is fed to a preheater and preheated to a suitable temperature, e.g. between about 300 to 400° C. The preheated mixture is passed to the reactor at a flow rate of about 0.4 cubic feet per hour. The weight hourly space velocity may vary from about 0.05 to 0.40 hr.$^{-1}$ and the linear velocity from about 0.2 to 0.6 ft./sec. The reactor, maintained at a temperature of about 450° C. and a pressure of about 100 p.s.i.g., is immersed in a constant temperature bath, which is preferably an electrically heated salt-bath containing, for instance, a mixture of potassium and sodium nitrate in a weight ratio of about 1:1. The salt bath is stirred by an agitator and its temperature may be controlled to ±0.5° C. by any suitable means, for instance, a Gardsman regulator in order to provide suitable means for dissipating the heat of reaction. The reacotr is packed with a catalyst comprising vanadium oxide promoted with zirconium and terbium oxides on alypha-alumina and is in the form of granules having a particle size of about 8 to 10 mesh. The catalyst is substantially that prepared according to the mehtod outlined in Example I. The weight percent of vanadium, zirconium and terbium oxides on a support-free basis in this catalyst amounted to 97.6%, 1.52% and 0.51% respectively.

The products of oxidation leave the reactor and are passed to the third zone. The reactor effluent enters an air condenser after which it is passed to the first of two Dry Ice condensers, thence, to the second Dry Ice condenser and wet test meter after which it is to the atmosphere. A 74 mole percent yield of phthalic anhydride with less than 1% maleic anhydride being formed was recovered. Neither phthalide nor ortho-tolualdehyde are formed, although some formaldehyde appears to be present in the reaction product. The balance consisted of carbon oxides. The latter determinations may be carried out in a conventional Orsat apparatus. Alternatively, the phthalic anhydride may be removed from the gases by suitable means such as by contacting them directly with a spray of water or with an aqueous slurry of phthalic acid or scrubbing them with aromatics such as benzene, xylene, diphenyl and methyl-naphthalene. The scrubbing may be conducted in either a spray tower, in a packed tower or in other equivalent equipment. Subsequent purification of the recovered phthalic anhydride is usually not necessary. However, if it is required it may be accomplished by such means as distillation in the presence of sulfuric acid, sublimation, solvent extraction with benzene or xylene, or recrystallization from a non-aqueous solvent such as carbon tetrachloride.

Example VI

Example V was repeated except that the catalyst employed was an alpha-alumina supported partially fused catalyst consisting of vanadium pentoxide, zirconium oxide and praseodymium oxide, present in amounts of 10 weight percent, 0.3 weight percent and 0.1 weight percent, respectively, by weight based on the total catalyst. The results of this run are shown in Table I.

Example VII

Example V is repeated, except that the feed mixture contains 1.4 mole percent ortho-xylene in air and the catalyst employed was an alpha-alumina supported partially fused catalyst consisting of vanadium pentoxide of about 8 to 10 mesh size. The results of this run are given below in Table I.

Example VIII

Example V is repeated again, using a feed containing about 0.7 mole percent ortho-xylene in air. The example employed an alpha-alumina supported partially fused catalyst consisting of vanadium pentoxide and zirconium oxide prepared as described in Example I. The weight percent of vanadium and zirconium oxides on a support-free basis in this catalyst amounted to 95.54% and 4.46% respectively. These results are also shown in Table I.

Example IX

A gas mixture containing about 0.7 mole percent of ortho-xylene in air was oxidized at conditions similar to those described in Example V except that an alpha-alumina supported partially fused blend of vanadium pentoxide and praseodymium oxide, again prepared as described in Example I, was employed. The weight percent of vanadium and praseodymium oxides on a support-free basis in the catalyst was about 98.51% and 1.49%, respectively. These results are also shown in Table I.

Example X

A gas mixture again containing about 0.7 mole percent ortho-xylene in air was oxidized according to the method outlined in Example V. The catalyst used was alpha-alumina supported zirconium oxide of 8 to 10 mesh containing about 4.6 weight percent of said metal oxide. These results are also shown below in Table I.

Example XI

A gas mixture again containing about 0.7 mole percent ortho-xylene in air was oxidized according to the method outlined in Example V. The catalyst used was an alpha-alumina supported praseodymium oxide of 8 to 10 mesh size containing 3.8 weight percent of said metal oxide. These results are also shown below in Table I.

TABLE I

| Examples | V | VI | VII | VIII | IX | X | XI |
|---|---|---|---|---|---|---|---|
| Catalytic metals | V-Zr-Tb | V-Zr-Pr | V | V-Zr | V-Pr | Zr | Pr |
| Experimental conditions: | | | | | | | |
| Temperature of bath in °C | 450 | 450 | 460 | 450 | 450 | 450 | 450 |
| Hydrocarbon in air in mole percent | 0.7 | 0.7 | 1.4 | 0.7 | 0.7 | 0.7 | 0.7 |
| Weight hourly space velocity in hr.$^{-1}$ | 0.1 to 0.3 | 0.1 to 0.3 | 0.1 to 0.3 | 0.1 to 0.3 | 0.1 to 0.3 | 0.1 to 0.3 | 0.1 to 0.3 |
| Volume hourly space velocity in hr.$^{-1}$ | 14,400 | 14,400 | 14,400 | 14,400 | 14,400 | 14,400 | 14,400 |
| Product distribution in mole percent: | | | | | | | |
| Phthalic anhydride | 74.0 | 70 | 68.1 | 69.5 | 68.2 | None | None |
| Maleic anhydride | <1 | <1 | 8.1 | 1.1 | 0.8 | None | None |
| Ortho-tolualdehyde | None | None | 0.6 | 4.0 | None | None | None |
| Phthalide | None | None | 1.5 | 6.2 | None | None | None |
| Carbon oxides | ~25.0 | ~29 | 23.7 | 18.2 | 31.0 | 1.8 | 91.0 |
| Unreacted ortho-xylene | None | None | None | None | None | 98.2 | 9.0 |

These data show that when employing the doubly promoted catalyst of this invention, i.e. Examples V and VI, the production of undesirable by-products of aromatic oxidation is substantially minimized.

It is to be understood that the foregoing detailed description is given merely by way of illustration and that the physical equipment may be interchanged with other known reactors which are designed to provide intimate contact between the catalyst and reacting gases and that other variations also may be made without departing from the spirit of this invention.

What is claimed is:

1. A process for the catalytic vapor phase oxidation of an ortho-(di-lower alkyl)benzene to the corresponding anhydride which comprises reacting said ortho(di-lower alkyl)benzene in the vapor phase at a temperature from about 300 to 600° C. with molecular oxygen in the presence of a fused vanadium pentoxide oxidation catalyst, said catalyst being provided with promotional amounts of zirconium oxide and a lanthanide series metal oxide.

2. The process of claim 1 wherein the promoting zirconium metal is about 0.1 to 5 weight percent of the vanadium pentoxide and the lanthanide series metal is about 0.01 to 5 weight percent of the vanadium pentoxide, said zirconium and lanthanide series metal being calculated as their oxides.

3. The process of claim 1 wherein the lanthanide series metal is terbium.

4. The process of claim 2 wherein the metal oxides are supported on an inert carrier, said oxides being present in an amount of about 1 to 20 weight percent of the total catalyst.

5. The process of claim 4 wherein the vapor phase oxidation is the oxidation of ortho xylene to phthalic anhydride.

6. The process of claim 4 wherein the inert carrier is alpha-alumina.

7. The process of claim 5 wherein the oxidation is conducted at a temperature from about 400 to 500° C.

References Cited by the Examiner

UNITED STATES PATENTS

| | | | |
|---|---|---|---|
| 2,524,810 | 10/1950 | Kimberlin | 252—461 |
| 2,565,347 | 8/1951 | Bremmer et al. | 252—461 |
| 2,698,306 | 12/1954 | Matejczyk | 252—464 |
| 2,930,802 | 3/1960 | Aries | 260—346.4 |
| 2,942,005 | 6/1960 | Brown et al. | 260—346.4 |
| 3,014,899 | 12/1961 | Engel | 252—464 |

NICHOLAS S. RIZZO, *Primary Examiner.*

H. R. JILES, *Assistant Examiner.*